(12) United States Patent
Kofod et al.

(10) Patent No.: US 10,049,421 B2
(45) Date of Patent: Aug. 14, 2018

(54) SECURE CONTENT AND DOCUMENT WATERMARKING

(71) Applicant: The Sixth Flag, Inc., Raleigh, NC (US)

(72) Inventors: Peter M. Kofod, Raleigh, NC (US); David Kinghorn, Cary, NC (US)

(73) Assignee: The Sixth Flag, Inc., Raleigh, NC (US)

( * ) Notice: Subject to any disclaimer, the term of this patent is extended or adjusted under 35 U.S.C. 154(b) by 161 days.

(21) Appl. No.: 15/055,240

(22) Filed: Feb. 26, 2016

(65) Prior Publication Data
US 2016/0253772 A1    Sep. 1, 2016

Related U.S. Application Data

(60) Provisional application No. 62/126,078, filed on Feb. 27, 2015.

(51) Int. Cl.
| | | |
|---|---|---|
| *G06K 9/00* | (2006.01) | |
| *G06T 1/00* | (2006.01) | |
| *G06F 21/16* | (2013.01) | |

(52) U.S. Cl.
CPC ............ *G06T 1/0021* (2013.01); *G06F 21/16* (2013.01); *G06T 2201/0051* (2013.01)

(58) Field of Classification Search
CPC ............ G06T 1/0021; G06T 2201/0051; G06F 21/16
See application file for complete search history.

(56) References Cited

U.S. PATENT DOCUMENTS

| | | | | |
|---|---|---|---|---|
| 9,734,353 | B2 * | 8/2017 | Cao ...................... | G06F 21/6245 |
| 9,747,656 | B2 * | 8/2017 | Stach .................... | G06T 1/0028 |
| 2007/0291318 | A1 * | 12/2007 | Wang ................. | H04N 1/00358 |
| | | | | 358/3.28 |
| 2016/0371825 | A1 * | 12/2016 | Kurkure ................ | G06T 7/0002 |

* cited by examiner

*Primary Examiner* — Shefali Goradia
(74) *Attorney, Agent, or Firm* — Withrow & Terranova, PLLC

(57) ABSTRACT

According to one aspect, the subject matter described herein includes a method for secure content watermarking. The method includes generating a watermark that encodes information as a set of visual elements; receiving content that represents a graphical workspace to be displayed to a user; creating watermarked content by combining an image of the received content with at least one copy of the watermark sufficient to fill the area of the image; and displaying the watermarked content to the user via a display device having a display area. Should the user take a screenshot or take a picture of some or all of the watermarked content, the picture so acquired will contain watermark information that can be used to identify the session from which the picture or screenshot was taken.

24 Claims, 9 Drawing Sheets
(4 of 9 Drawing Sheet(s) Filed in Color)

SECURE CONTENT AND DOCUMENT WATERMARKING

PRIORITY CLAIM

This application claims priority to U.S. Provisional Patent Application Ser. No. 62/126,078, filed on Feb. 27, 2015 and entitled "SECURE CONTENT AND DOCUMENT WATERMARKING", which is herein incorporated by reference in its entirety.

TECHNICAL FIELD

This disclosure relates to remote computing. More specifically, it relates to methods and systems for providing secure content and document watermarking.

BACKGROUND

In a global economy, an organization's workforce may be located in various locations around the world. Because computers, and the potentially proprietary data that they may contain, may not be contained in a secure environment under the control of the company, there is a real risk that proprietary, confidential, and/or sensitive data (herein referred to as "protected data") may be accessed or intercepted by unauthorized parties, whether by access to (or theft of) the personal computer or by interception of the data going across the connection to the remotely located personal computer. In addition, a company must try to protect itself from the theft of protected data by an employee or contractor having access to that data.

Conventional approaches to these problems include disabling the hardware that a malicious or unauthorized user might try to use to move or copy protected data to another location. For example, a worker in a remote location may be provided with a laptop computer having no floppy disk, no CD/DVD burner, and USB ports disabled. However, this is not an ideal solution because there is nothing to stop that worker from adding a mass storage peripheral, activating disabled ports, and so on.

Another conventional approach to these problems involves embedding some form of data within a file. This data is herein referred to as a "digital watermark" (or just "watermark" for brevity), and is named after the faint design that is made in some paper during manufacture, that is visible when held against the light, and that typically identifies the maker. A watermark may be hidden with an image file, a text file, or other type of file. The watermark data may identify the file itself, the source of the file, the computer or network address of the current location of the file, the name of the user that created, accessed, or modified, the file, or other information. However, this approach has two disadvantages. First, a savvy user may know how to identify and manipulate or remove the digital watermark. Second, the watermark may be lost when the file is converted from one form to another. For example, an image file may be converted from one format to another, e.g., from JPG to PNG. Likewise, a text file may be printed to PDF, scanned to a TIFF file, and so on. The watermarking information may be lost during those conversions.

Furthermore, most operating systems have the capability to take screen shots, i.e., images of data that is displayed on the computer screen at a given moment. These screen shots, which may display images, the contents of text files, and the like, may be printed, emailed, or saved to disk for later transfer. In this manner, protected data may still be compromised, even in systems having disabled peripherals, and even in systems that use digital watermarks within the files themselves.

Even in systems where the screen shot function is disabled, a malicious or unauthorized user can take a picture of the computer screen using a camera. In this scenario, a company that discovers that its protected data is being leaked by screen shots or photos is likely to be highly motivated to determine the source of the leak.

Thus, there is a need for a computing platform that allows an organization to secure its protected data from unauthorized access and to provide some way to identify the source of leaked data if that occurs. More specifically, there is a need for methods and systems for secure content watermarking and for identifying the source of leaked information.

SUMMARY

The subject matter disclosed herein includes methods, systems, and non-transitory computer readable media for providing secure content watermarking in a manner that enables identifying the source of improperly shared information.

According to one aspect, the subject matter described herein includes a method for secure content watermarking. In one embodiment, the method includes generating a watermark that encodes information as a set of visual elements; receiving content that to be displayed to a user; creating watermarked content by overlaying an image of the received content with at least one copy of the watermark sufficient to fill the area of the image; and displaying the watermarked content to the user. The user will see the content as an image that is completely filled with copies of the visual watermark. Should the user take a screenshot or take a picture of some or all of the watermarked content, the picture so acquired will contain watermark information that can be used to identify the session from which the picture or screenshot was taken, for example.

In one embodiment, combining the image of the received content with the at least one copy of the watermark comprises overlaying the watermark onto the image, adding the watermark to the image, subtracting the watermark from the image, or exclusive OR (XOR)ing the watermark with the image.

In one embodiment, displaying the watermarked content to the user comprises displaying the watermarked content via a display device having a display area. In one embodiment, the watermarked content entirely fills the display area of the display device.

In one embodiment, the received content comprises data from a local or remote session of the user and that represents a graphical workspace of the user. In one embodiment, the data comprises an image of a local or remote desktop, workspace, or application.

In one embodiment, the content to be displayed to the user comprises a document, and displaying the watermarked content comprises displaying the document to the user.

In one embodiment, wherein the encoded information includes information to directly or indirectly identify a session, a user, a component of hardware, local or remote compute resources, a web browser or other application, a network, a date, a time, or a location.

In one embodiment, the set of visual elements comprises dots, lines, shapes, glyphs, colors, or images. In one embodiment, the set of visual elements encodes information via size, color, shape, position, spacing, or variations of the above.

In one embodiment, creating the watermarked content includes generating the watermark and tiling the watermark across the area of the received content. In one embodiment, generating a watermark includes generating a watermark that is encoded for error correction.

In one embodiment, the watermark represents a number that identifies an entry in a collection of data that is used to store session-related information.

In one embodiment, the color of the watermark varies according to the position of the watermark within the display area. In one embodiment, the color of the watermark varies according to the content of the display area over which the watermark appears.

In one embodiment, displaying the watermarked content to the user via the display device comprises sending the watermarked content to the user for display via a remote display device.

According to another aspect, the subject matter described herein includes a system for secure content watermarking, the system comprising: a first hardware module for generating a watermark that encodes information as a set of visual elements; and a second module for receiving content representing a graphical workspace to be displayed to a user and creating watermarked content by combining an image of the received content with at least one copy of the watermark sufficient to fill the area of the image.

In one embodiment, the second module combines the image of the received content by overlaying the watermark onto the image, adding the watermark to the image, subtracting the watermark from the image, or exclusive OR (XOR)ing the watermark with the image.

In one embodiment, the system includes a display device having a display area for displaying the watermarked content to a user. In one embodiment, the watermarked content entirely fills the display area of the display device.

In one embodiment, the received content comprises data from a local or remote session of the user. In one embodiment, the data comprises an image of a local or remote desktop, workspace, or application.

In one embodiment, the encoded information comprises session-related information. In one embodiment, the encoded session-related information includes information to identify a session, a user, a component of hardware, local or remote compute resources, a web browser or other application, a network, a date, a time, or a location.

In one embodiment, the set of visual elements comprises dots, lines, shapes, glyphs, colors, or images. In one embodiment, the set of visual elements encodes information via size, color, shape, position, spacing, or variations of the above.

In one embodiment, creating the watermarked image includes generating the watermark and tiling the watermark across the area of the image. In one embodiment, generating a watermark includes generating a watermark that is encoded for error correction. In one embodiment, the watermark represents a number that identifies an entry in a collection of data that is used to store session-related information.

In one embodiment, the color of the watermark varies according to the position of the watermark within the display area. In one embodiment, the color of the watermark varies according to the content of the display area over which the watermark appears.

The subject matter described herein for providing secure content watermarking or for identifying the source of improperly shared information may be implemented in hardware, software, firmware, or any combination thereof.

As such, the terms "function" or "module" as used herein refer to hardware, software, and/or firmware for implementing the feature being described.

It should be noted that the particular embodiments disclosed herein are exemplary and not limiting. For example, the first and second modules described above may be components of, or whose functions are performed by, a single module. Likewise, the functions performed by the first and second modules may be distributed over more than just two modules. The division of labor may by partitioned in alternative ways, e.g., into modules of alternative form and/or number. The same principles extend to apply to any or all of the modules or functions described herein.

In one exemplary implementation, the subject matter described herein may be implemented using a computer readable medium having stored thereon executable instructions that when executed by the processor of a computer control the computer to perform steps. Exemplary computer readable media suitable for implementing the subject matter described herein include disk memory devices, chip memory devices, programmable logic devices, application specific integrated circuits, and other non-transitory storage media. In one implementation, the computer readable medium may include a memory accessible by a processor of a computer or other like device. The memory may include instructions executable by the processor for implementing any of the methods described herein. In addition, a computer readable medium that implements the subject matter described herein may be located on a single device or computing platform or may be distributed across multiple physical devices and/or computing platforms.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Embodiments of the subject matter described herein will now be explained with reference to the accompanying drawings, wherein the like reference numerals represent like parts, of which.

DETAILED DESCRIPTION

Methods and systems for providing secure remote desktop computing with session watermarking are disclosed herein. Desktop session watermarking operates to discourage the disclosure of data rendered on a screen by embedding an encoded pattern on the screen, e.g., in a manner that the user cannot control, modify, remove, or suppress. In one embodiment, a visible watermark is superimposed on a screen, such that any capture and transmit a visual representation of the screen, either in the form of a screen capture or photo taken of the screen, will include session identifying information (SIDI). SIDI can include, but is not limited to, data to identify the authenticated user, a time stamp of the session, an IP address of the system presenting the data, and an application presenting the data.

In one embodiment, the SIDI is encoded using a highly redundant ternary (base-3) mechanism. In one embodiment, the SIDI may be encoded as a pattern displayed on the screen. For example, the pattern may be rendered is a repeating 6×6 grid of symbols, where each symbol represents a ternary value. In one embodiment, each symbol is a dot, and the size, shape, color, or other characteristic of each dot indicates the symbol value. For example, in one embodiment, each dot is small, medium or large, representing 0, 1, or 2 in the ternary encoding. In other embodiments, the SIDI may be encoded using higher-order or lower-order bases. Likewise, the SIDI may be encoded using symbols other than dots and may be encoded in grids of other sizes, aspect ratios, and so on.

Using a ternary 6×6 grid, for example the possible encoding permutations is:

$$=3^{(6*6)}=3^{(36)}=1.5009463*10^{17} \text{ (approx.)}$$

In one embodiment, a 6×6 grid may be encoded as follows:

| $3^{35}$ | $3^{34}$ | $3^{33}$ | $3^{32}$ | $3^{31}$ | $3^{30}$ |
|---|---|---|---|---|---|
| $3^{29}$ | $3^{28}$ | $3^{27}$ | $3^{26}$ | $3^{25}$ | $3^{24}$ |
| $3^{23}$ | $3^{22}$ | $3^{21}$ | $3^{20}$ | $3^{19}$ | $3^{18}$ |

| $3^{17}$ | $3^{16}$ | $3^{15}$ | $3^{14}$ | $3^{13}$ | $3^{12}$ |
|---|---|---|---|---|---|
| $3^{11}$ | $3^{10}$ | $3^{9}$ | $3^{8}$ | $3^{7}$ | $3^{6}$ |
| $3^{5}$ | $3^{4}$ | $3^{3}$ | $3^{2}$ | $3^{1}$ | $3^{0}$ |

Each 6×6 grid is then repeated horizontally and vertically, filling the entire screen. An example of this is shown in FIGS. 1A and 1B.

Figure 1A:
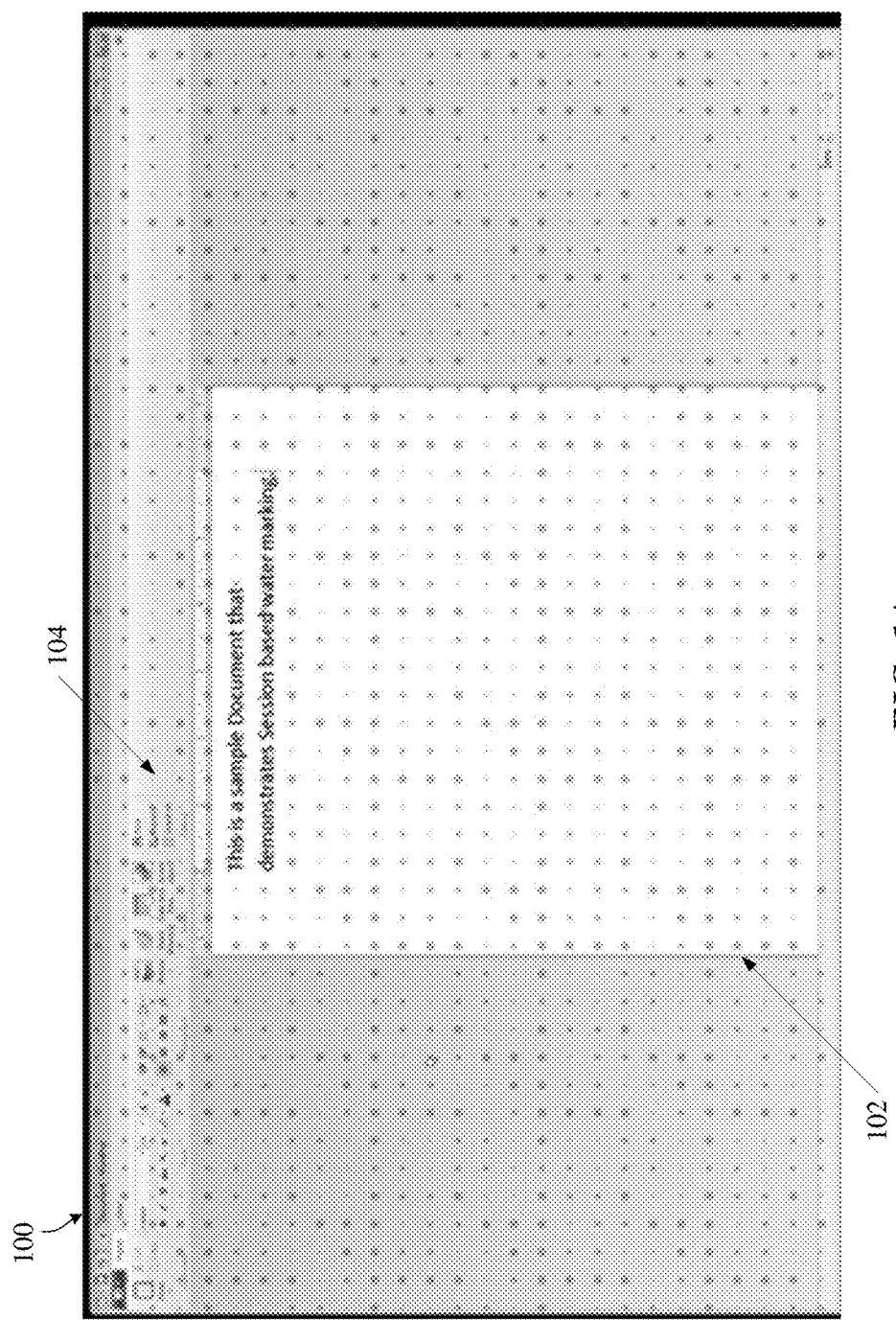
FIGS. 1A, 1B, and 1C are images of an exemplary screen that displays session watermarking according to an embodiment of the subject matter described herein.
Figure 1B:
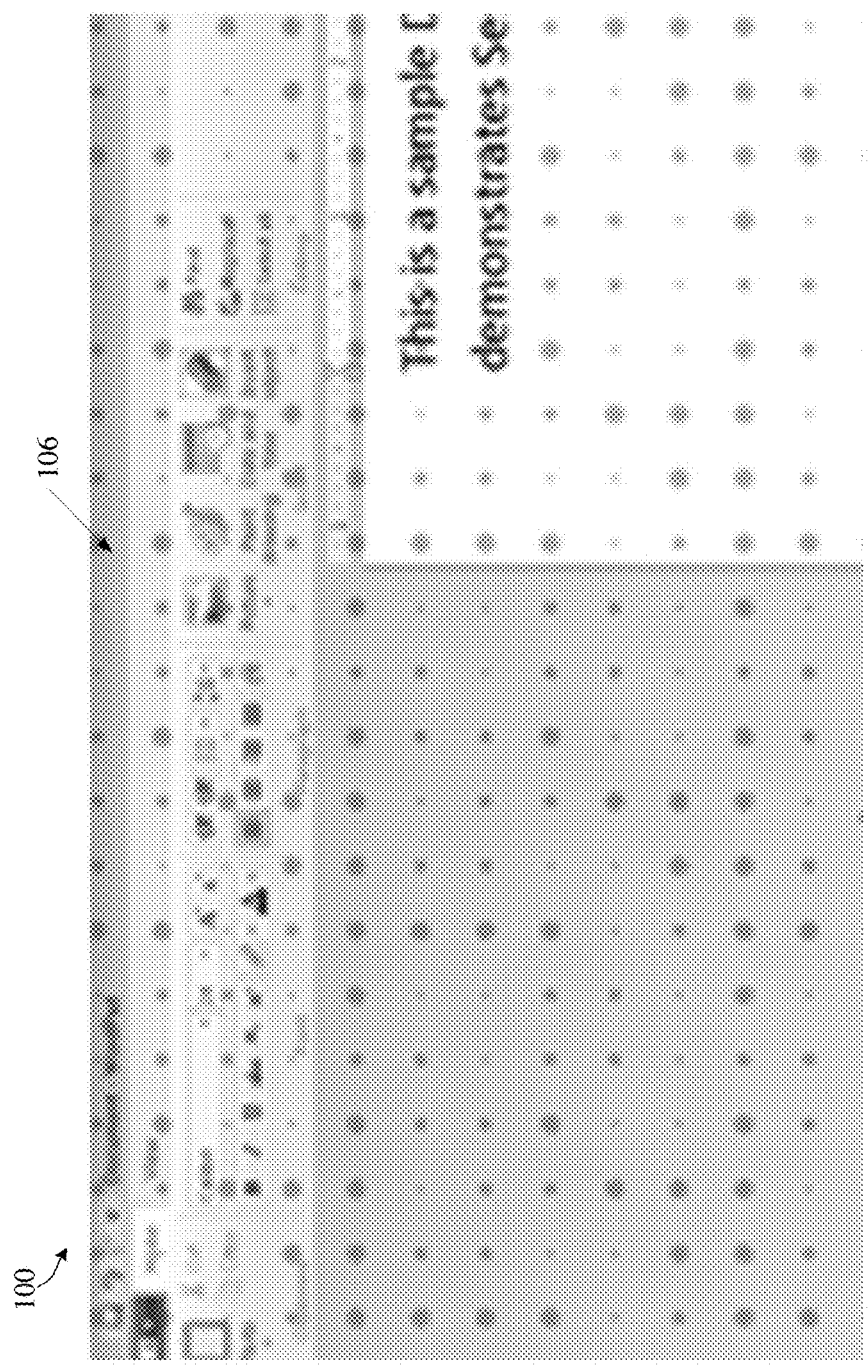
Figure 1C:
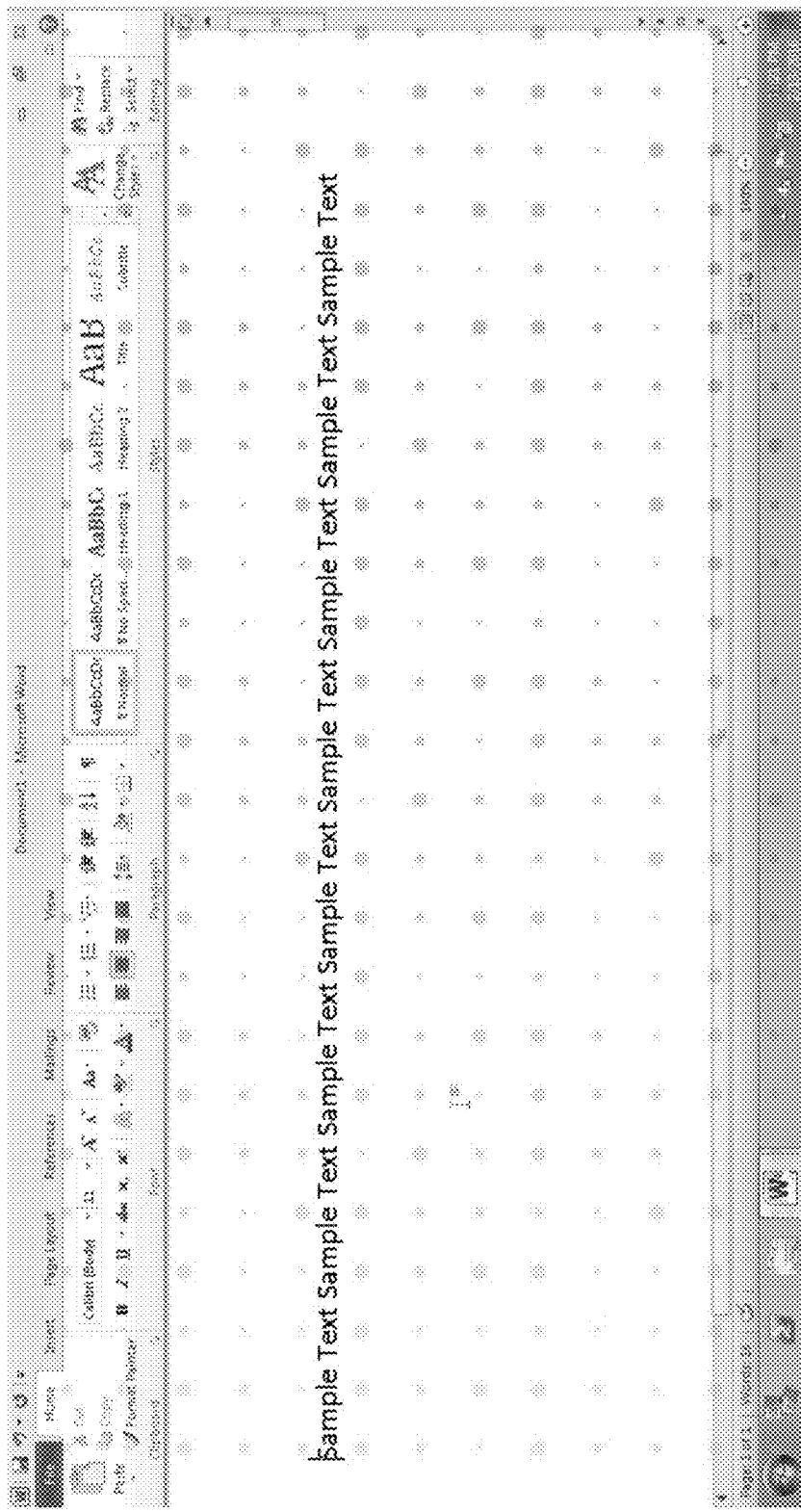

FIGS. 1A, 1B, and 1C are images of an exemplary screen that displays session watermarking according to an embodiment of the subject matter described herein. In the embodiment illustrated in FIG. 1A a portion of a screen 100 shows an example application—in this case, a text editing program—over which has been layered a repeating grid of dots that operate as a watermark. It can be seen that the watermark is visible not only within the document 102 but also within the graphic user interface (GUI) 104 of the application itself. FIG. 1B is a magnified portion of FIG. 1A, showing that the watermarking extends even into elements of the display that are usually under control of the operating system, such as the window border 106, and even the desktop. FIG. 1C shows a variation in which color or hue of the repeating grid of dots is not constant. In one embodiment, the color of the dots varies with relative position on the page, e.g., the color of the dots changes based on the left-right location of the dot on the display. In the embodiment illustrated in FIG. 1C, the color of the dots changes from yellow (on the left side of the display) to pale read or pink (in the middle of the display) and becoming blue (on the right side of the display). The color of the dots could likewise vary based on the dots' relative position between top and bottom, according to some other pattern, which may be ordered, random, pseudo-random, or some combination of all of the above.

In the example shown in FIGS. 1A, 1B, and 1C, the size, color, spacing, and opacity of the dots are chosen to be easily visible for the purposes of illustration, but these and other characteristics of the dots may be adjusted as needed. For example, in actual deployment, the opacity or size of the dots may be reduced so that the watermark is less distracting to the user (or harder for the user to detect.) Image manipulation programs may be later used to enhance a watermarked screen shot such that the watermark is easier to recognize and decode.

In one embodiment, the grid boundaries are not identified. As a result, the top left dot of a captured 6×6 grid may or may not be the top left element of the repeating 6×6 array, since there is no mechanism of indexing the high order ternary number (upper left corner of the grid). In this embodiment, the number of possible encoding permutations is the value shown above divided by by the grid size, 6×6=36:

$$= \frac{(3)^{(6*6)}}{36} = \frac{(3)^{(36)}}{36} = 4.1692954*10^{15} \text{ (approx.)}$$

To illustrate this principle graphically, consider the following simplified example of a 3×3 grid showing the ternary value of the dot (rather than the dot itself), where the letters A through I represent symbols from most significant position to least significant position:

| A | B | C |
|---|---|---|
| D | E | F |
| G | H | I |

In one embodiment, the grid shown above is repeated in all directions across the screen. Any of the following 3×3 grids may be captured as part of a screen shot:

| A | B | C | B | C | A | C | A | B |
|---|---|---|---|---|---|---|---|---|
| D | E | F | E | F | D | F | D | E |
| G | H | I | H | I | G | I | G | H |

| D | E | F | E | F | D | F | D | E |
|---|---|---|---|---|---|---|---|---|
| G | H | I | H | I | G | I | G | H |
| A | B | C | B | C | A | C | A | B |

| G | H | I | H | I | G | I | G | H |
|---|---|---|---|---|---|---|---|---|
| A | B | C | B | C | A | C | A | B |
| D | E | F | E | F | D | F | D | E |

Thus, there are 9 different positional permutations that may be captured for this 3×3 grid. Their numeric values are represented symbolically as: ABCDEFGHI, BCAEFDHIG, CABFDEIGH, DEFGHIABC, EFDHIGBCA, FDEIGH-CAB, GHIABCDEF, HIGBCAEFD, and IGHCABFDE. The positional permutations shown above can be described as the original 3×3 grid but with rows rotated, columns rotated, or both rows and columns rotated. In addition, not shown above, but also considered, are rotations around an axis that is normal to this page, herein referred to as the "Z axis". Using a 3×3 grid represented by "ABCDEFGHI" as an example, an image may capture a screen rotated 90 degrees clockwise (resulting in "GDAHEBIFC"), 90 degrees counter-clockwise (resulting in "CFIBEHADG"), or 180 degrees in either direction (resulting in "IHGFED-CBA".) The 9 positional permutations, each of which having 4 rotational permutations (referred herein as "up", "right", "left", and "down"), create 36 different permutations for the same 3×3 grid. For brevity, the positional and rotational permutations may be collectively referred to as simply "permutations" of the original grid. In one embodiment, all the 36 of the different numeric values for each of these permutations would all be associated with the same SIDI.

Returning to the 6×6 grid example, in the same manner, there are 36 positional permutations, each of which having 4 rotational permutations, for a total of 144 different numeric values for the same 6×6 grid. In one embodiment, all 144 numeric values may be associated with the same SIDI. Thus, regardless of the rotational orientation and regardless of which element of the 6×6 grid is selected as the top-left quadrant, a search will render the correct SIDI. In one embodiment, other elements of a screen shot, such as menu location, text orientation, and the like, may be used to determine the rotational orientation, in which case only the 36 positional permutations need be associated with the same SIDI.

In an alternative embodiment, the grid boundaries may be identified. For example, the grid boundaries may be identified by additional graphic elements, such as lines, or by modification of existing graphic elements, such as distinct dot shapes or colors, or by other means. In these embodiments, the rotational orientation and/or position of the highest order ternary number may be determined, in which case it may not be necessary to map all permutations of a grid to the same SIDI.

In one embodiment, the repeated pattern of the encoding mechanism ensures that even if only a small section of the rendered screen is displayed, the SIDI can be recovered. Furthermore, in the situation where an inadequate number of symbols (e.g., dots) are collected, or the size (or other characteristic) of the symbol is misidentified, fuzzy search may applied to determine the correct SIDI. For example, if the numeric value determined from the grid is not mapped to an SIDI, fuzzy logic may be used to determine the most likely candidate. Where multiple patterns are mapped to a single SIDI, as described above, this information may be used to verify that the guess was correct, e.g., by rotating the guessed pattern and determining whether that permutation returns the same SIDI. Pattern shifting can be employed either horizontally or vertically to improve grid identification.

In one embodiment, error correction techniques may be used to recover the correct numeric value in a scenario where some of the symbol data is missing or ambiguous. In one embodiment, for example, each glyph or symbol represents a discrete value that is evaluated independently of other glyphs in the watermark. Therefore, an incomplete or incorrect entered watermark may still result in a positive SIDI identification. In the case that no exact matches are found, nearest matches may be suggested. Because each glyph is valuated independently, an aggregate accuracy confidence can be derived against near matches.

In one embodiment, the watermarking techniques described herein are used to watermark remote sessions where the remote desktop is displayed to a user within a browser window, e.g., via a secure browser.

The same techniques may be likewise applied to configurations where the remote desktop is displayed within a virtual machine (VM), which has the additional advantages that the local data may be saved as encrypted data and that the VM instance may be deleted entirely after its use. Should the VM become infected with a computer virus, the computer virus would also be deleted along with the VM instance that it infected, e.g., the virus cannot propagate to the system that hosted the virtual machine.

The example implementations described above are illustrative and not intended to be limiting. A sample of alternative implementations are discussed below:

Grid size and shape. Grid sizes can be any size and do not have to be square. Selection criteria should balance the need for collision avoidance, a function of hash size, and redundancy, which contributes, to resilient SIDI recovery.

Dot encoding. In addition to using dot size, the following characteristics, including combinations thereof, can be used to differentiate values in various implementations of the session watermarking encoding scheme:

Color Coding. Different values of dots can be represented by dot color.

Dot Shape. Different shapes, such as square, triangle and circle can be used

Variable Dot Density. Distance between dots can be varied in which the distance represents a numeric value.

Alternatives to Dot Encoding. In addition to dot encoding, the following mechanisms could be used in other embodiments:

Lines of varying density, color, and separation distance.

Grids of lines of varying density, color and separation distance.

Usability. The following characteristics can be modified to improve usability while simultaneously rendering a clear encoded pattern:

Dot density.

Dot transparency

Dot hue and color selection

As discussed above with respect to FIG. 1C, in one embodiment, the watermark may include a color spectrum. For example, the hue of the watermark components may vary with position on the display or page. This increases the likelihood that the watermark will be visible on at least some part of the display, regardless of the color content of the display. In one embodiment, the hue of the watermark changes across the N×N grid that makes up the minimum watermark size, such that the color pattern repeats with each copy of the N×N grid that appears on the display. In another embodiment, the hue of the watermarks changes across the width and/or height of the entire display. For example, the watermarks on the left side of a display may be one color and the watermarks on the right side of the display may be another color. Likewise, watermarks on the top of the display may be a different color from watermarks on the bottom of the display. It will be understood that the hue may change from side to side, from top to bottom, or both, or diagonally, and so on. Whether the hue changes within the N×N grid or across the screen, the color may change continually or in discrete steps. The colors may change in order of frequency (i.e., in "rainbow" order) or in any other sequence. In one embodiment, the color of the watermark may depend on the color of the content over which that portion of the watermark is being displayed. For example, the color of the watermark or a portion thereof may be the color inversion of the background or otherwise dynamically chosen to provide the best contrast against the background. Likewise, the color of the watermark or a portion thereof may be chosen to be the least intrusive visually while still remaining detectable for its intended purpose. Other algorithms or approaches to selecting the color of the watermark are also contemplated by the subject matter described herein.

Encoding Base. In one embodiment, a ternary system (base-3) is used, but any base system may be used. A combination dot encoding can be used to increase the base. For example, a system that uses dots of three sizes, each in two colors, would create a base-6 encoding algorithm. The following criteria impact encoding base selection:
- Background complexity, including movement, color, resolution and level of detail.
- Size of SIDI store. A system that will retain a large history of session watermarks will need a larger set of permutations in which a larger encoding base creates higher data density of the watermark.

The significant balance that is struck in various implementations is between requirements for high density encoding and ease of discerning between glyphs.

Encoded Value. In one embodiment, a unique hash is encoded, which is in turn used as an index in a hash table serving up the SIDI. Other values such as indexes, user IDs, time stamps, IP addresses can be directly encoded. Examples include n-ary coded decimal notation (where n is the encoding base), ASCII encoding, incremental indexes, and hash tables.

Use Case—Session Watermarking. In one embodiment, the encoding is used to uniquely identify a web-based user session, including relevant session metadata. Alternate use cases and embodiments include, but are not limited to, any desktop or application, including virtual or remote desktops, remote assistance, screen sharing or content distribution mechanism where watermarking of the shared content is desired. Existing products that could benefit from the methods and systems described herein include, but are not limited to, Webex™, GoToMeeting™, Citrix™, Filehsare™, VMware™ VDI™, etc.)

Use Case—Unique User Watermarking. In another embodiment, the encoding may be used by any type of content-producing application such as a word processor (e.g., Microsoft Word™) or document publisher (e.g., Adobe Acrobat™) to watermark produced content in such a way as to identify the creator of content (e.g., the user/author) or provide information that may be used to identify the creator of the watermarked content. Any application that produces a document that can be shared and read, either via the original application or a dedicated document reader (e.g., Adobe Acrobat Reader) can implement unique user watermarking.

In one embodiment, an administrator may use an administrative console to enter recovered watermarking samples and the processor will recover the matching SIDI. An example of the Watermark Lookup utility is shown in FIG. 2.

Figure 2:
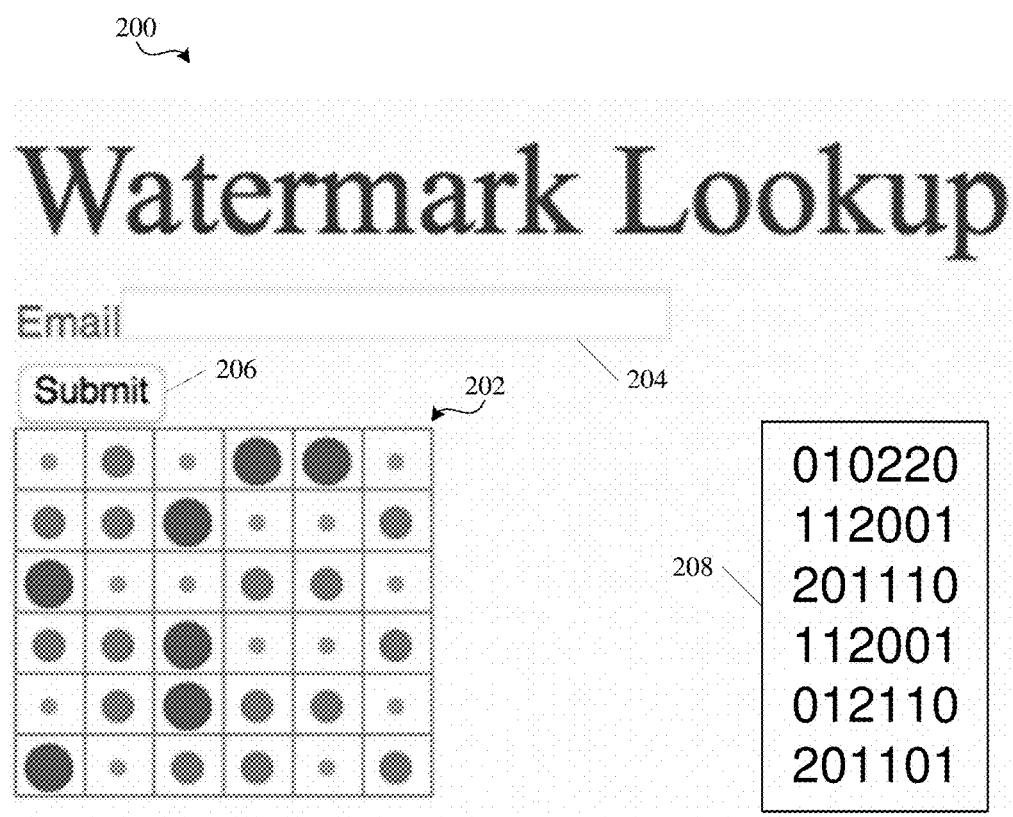
FIG. 2 illustrates an exemplary administrative console according to an embodiment of the subject matter described herein.

FIG. 2 illustrates an exemplary administrative console according to an embodiment of the subject matter described herein. In the embodiment illustrated in FIG. 2, console 200 includes a watermark grid 202 for entering or displaying a watermark grid, an entry field 204 where the administrator or user can enter an email address, and a submit button 206. The numeric value of the watermark being displayed in grid 202 is shown in box 208. In the example illustrated in FIG. 2, the ternary value of the watermark displayed in grid 202 is:

TABLE 1

| 0 | 1 | 0 | 2 | 2 | 0 |
| 1 | 1 | 2 | 0 | 0 | 1 |
| 2 | 0 | 1 | 1 | 1 | 0 |
| 1 | 1 | 2 | 0 | 0 | 1 |
| 0 | 1 | 2 | 1 | 1 | 0 |
| 2 | 0 | 1 | 1 | 0 | 1 | or "010220112001200110112001012110201101". Because the high order position cannot be determined (due to screen "cut off"), there is a row-based "wrap around" of the ternary digits, so in a 6×6 grid, the following values will result in a match:

TABLE 2

| 010220 | 102200 | 022001 | 220010 | 200102 | 001022 |
| 112001 | 120011 | 200111 | 001112 | 011120 | 111200 |
| 200110 | 001102 | 011020 | 110200 | 102001 | 020011 |
| 112001 | 120012 | 200121 | 001212 | 012120 | 121200 |
| 012110 | 121100 | 211001 | 110012 | 100121 | 001211 |
| 201101 | 011012 | 110120 | 101201 | 012011 | 120110 |
| 112001 | 120011 | 200111 | 001112 | 011120 | 111200 |
| 200110 | 001102 | 011020 | 110200 | 102001 | 020011 |
| 112001 | 120012 | 200121 | 001212 | 012120 | 121200 |
| 012110 | 121100 | 211001 | 110012 | 100121 | 001211 |
| 201101 | 011012 | 110120 | 101201 | 012011 | 120110 |
| 010220 | 102200 | 022001 | 220010 | 200102 | 001022 |
| 200110 | 001102 | 011020 | 110200 | 102001 | 020011 |
| 112001 | 120012 | 200121 | 001212 | 012120 | 121200 |
| 012110 | 121100 | 211001 | 110012 | 100121 | 001211 |
| 201101 | 011012 | 110120 | 101201 | 012011 | 120110 |
| 010220 | 102200 | 022001 | 220010 | 200102 | 001022 |
| 112001 | 120011 | 200111 | 001112 | 011120 | 111200 |
| 112001 | 120012 | 200121 | 001212 | 012120 | 121200 |
| 012110 | 121100 | 211001 | 110012 | 100121 | 001211 |
| 201101 | 011012 | 110120 | 101201 | 012011 | 120110 |
| 010220 | 102200 | 022001 | 220010 | 200102 | 001022 |
| 112001 | 120011 | 200111 | 001112 | 011120 | 111200 |
| 200110 | 001102 | 011020 | 110200 | 102001 | 020011 |
| 012110 | 121100 | 211001 | 110012 | 100121 | 001211 |
| 201101 | 011012 | 110120 | 101201 | 012011 | 120110 |
| 010220 | 102200 | 022001 | 220010 | 200102 | 001022 |
| 112001 | 120011 | 200111 | 001112 | 011120 | 111200 |
| 200110 | 001102 | 011020 | 110200 | 102001 | 020011 |
| 112001 | 120012 | 200121 | 001212 | 012120 | 121200 |
| 201101 | 011012 | 110120 | 101201 | 012011 | 120110 |
| 010220 | 102200 | 022001 | 220010 | 200102 | 001022 |
| 112001 | 120011 | 200111 | 001112 | 011120 | 111200 |
| 200110 | 001102 | 011020 | 110200 | 102001 | 020011 |
| 112001 | 120012 | 200121 | 001212 | 012120 | 121200 |
| 012110 | 121100 | 211001 | 110012 | 100121 | 001211 |

Figure 3:
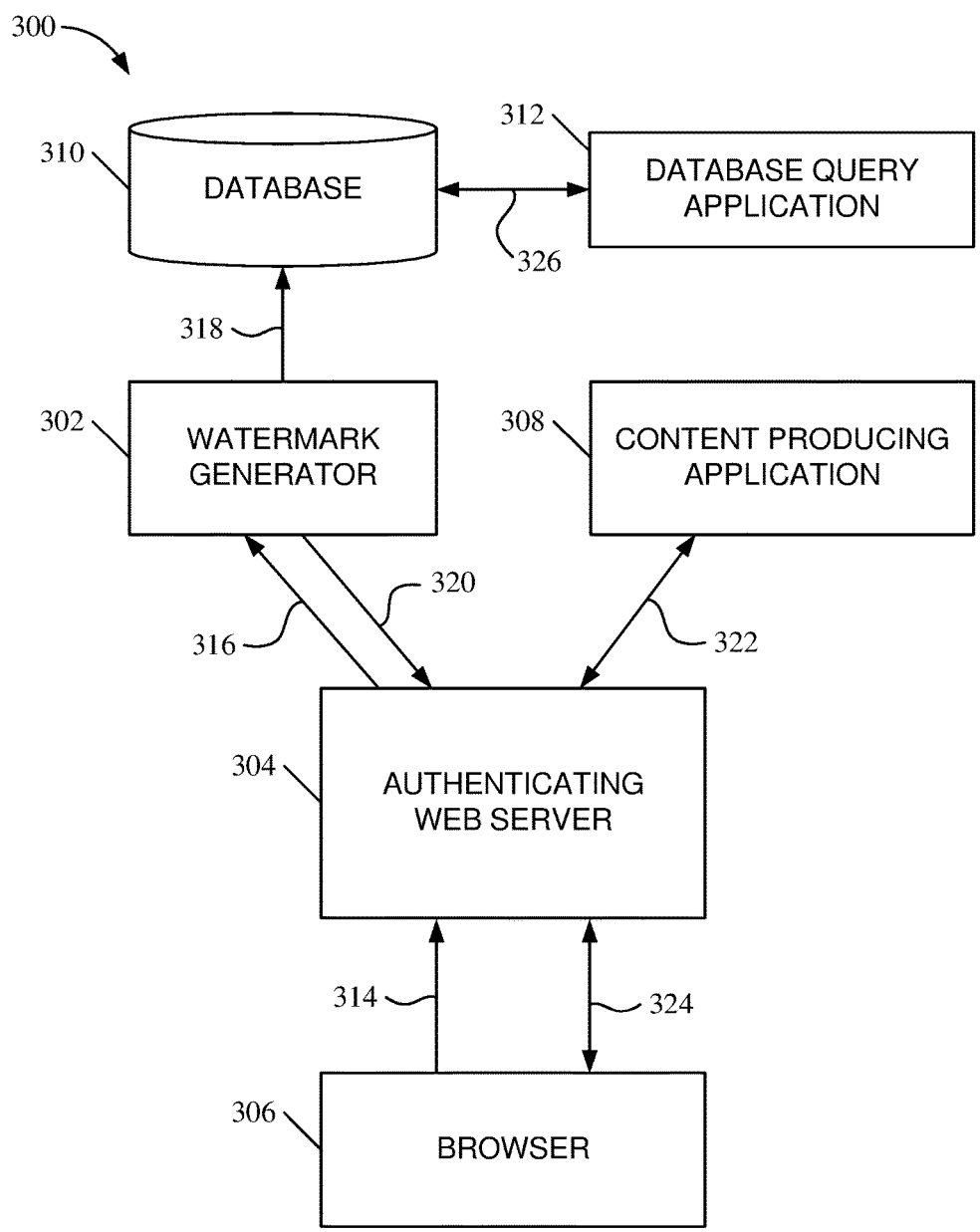
FIG. 3 is a block diagram illustrating an exemplary system for providing secure content watermarking according to an embodiment of the subject matter described herein.

FIG. 3 is a block diagram illustrating an exemplary system for for providing secure content watermarking according to an embodiment of the subject matter described herein. In the embodiment illustrated in FIG. 3, system 300 includes a first hardware module, watermark generator 302, for generating a watermark that encodes information as a set of visual elements. In the embodiment illustrated in FIG. 3, watermark generator 302 interacts with a second module, web server 304, for receiving content to be displayed to a user and creating watermarked content by combining an image of the received content with at least one copy of the watermark sufficient to fill the area of the image. In the embodiment illustrated in FIG. 3, for example, web server 304 receives content from content producing application 308 and provides that content to a user via a web browser 306. Examples of such content include, but are not limited to, remote access to a desktop that is hosted on a compute resource that runs an operating system.

Watermark generator 302 generates a watermark based on input information. In the embodiment illustrated in FIG. 3, for example, watermark generator 302 creates a watermark that encodes session identification information (SIDI), but other types of information may be used as input into the watermark generation process. A database 310 may be used to store the input information, the watermark generated by the input information, or both. Other information may also be stored in database 310.

The watermark that is generated may include some or all of the input information (referred to herein as "direct encoding"), or it may contain information that may be used to identify the input information (herein referred to as "indirect encoding".) In the embodiment illustrated in FIG. 3, for example, the watermark created by watermark generator 302 might contain not the input information itself but instead an index or key that may be used to query database 310 to retrieve the input information. In the embodiment illustrated in FIG. 3, a query application 312 may be provided for this purpose.

An example of the operation of system 300 will now be described. In the embodiment illustrated in FIG. 3, a user using browser 306 may desire access to content that is to be watermarked. In this scenario, browser 306 may provide authentication information 314 to authenticating web server 304. Upon successful authentication, web server 304 may pass input information 316, such as session identifying information, to watermark generator 302. Examples of input information may include, but are not limited to, user name or other user-identifying information, timestamp, network address, or other session identifying metadata.

In the embodiment illustrated in FIG. 3, watermark generator 302 stores data 318 in database 310. Data 318 may include some or all of the input data, the watermark generated from that data, other data, or some combination of the above.

In the embodiment illustrated in FIG. 3, watermark generator 302 generates a watermark 320, which it sends to web server 304. As described above, watermark 320 may directly encode some or all of the input data, or it may indirectly encode the input data, e.g., watermark 320 may encode an index or key which may be used to query database 310 to retrieve the input data. Content producing application 308 generates content 322, which is sent to authenticating web server 304. Web server 304 then combines watermark 320 and content 322 to produce watermarked content 324, which is provided to web browser 306. In one embodiment, web server 304 produces watermarked content 324 by overlaying content 322 with watermark 320. In one embodiment, the watermark is modified or repeated so that the watermark covers the entire area of displayed content 322, e.g., by tiling, tessellating, resizing, or other operation.

The content 322 and watermark 320 may be combined in a number of ways. Instead of simply overlaying the watermark onto the image, for example, in which the RGB values of the watermark replace the RGB values of the image underneath the watermark on a pixel-by-pixel basis, the watermark may be added to the image or subtracted from the image. In one embodiment, "adding" the watermark to the image means adding the RGB intensity values of the watermark to the RGB intensity values of the image on a pixel-by-pixel basis, which lightens the portion of the image underneath the watermark. Likewise, "subtracting" the watermark from the image means subtracting the watermark's RGB values from the image's RGB values on a pixel-by-pixel basis, which darkens the portion of the image underneath the watermark. Other Boolean operations may be performed on a pixel by pixel basis. For example, a black and white watermark may be exclusive OR'ed (XORed) with the image, with the result that wherever the watermark is black, the underlying image is color inverted, and wherever the watermark is white, the underlying image is unchanged. Other types and algorithms are contemplated.

The presence of the watermark across the entirety of the content means that, should the content be misappropriated by screen shot, by taking a picture of the screen with a separate camera, etc., the image so acquired will contain enough information encoded within the watermark to identify the source of the information and perhaps identify the individual who misappropriated the content.

In an alternative embodiment not shown in FIG. 3, content producing application 308 may send content 322 directly to watermark generator, which overlays, inserts, or otherwise combines content 322 to produce watermarked content 324, which is sent to web server 304. In this embodiment, watermark generator 302, rather than web server 304, produces the watermarked content. In yet another alternative embodiment, watermark generator 302 my provide watermark 320 directly to content generator 308, which creates watermarked content 324 and provides it to web server 304. In yet another alternative, browser 306 may combine watermark 320 and content 322 to produce watermarked content 324.

Referring again to FIG. 3, query application 312 may directly query database 310. For example, if it is discovered that protected content has been inappropriately released or published, the watermark may be identified and sent in a query 326 to database 310. If a match is found, database 310 may reply with some or all of the original input information, which may be used to identify the source of the protected content, e.g., the name of the user of the session, the date, time, location, or network address of the session, and so on.

Figure 4:
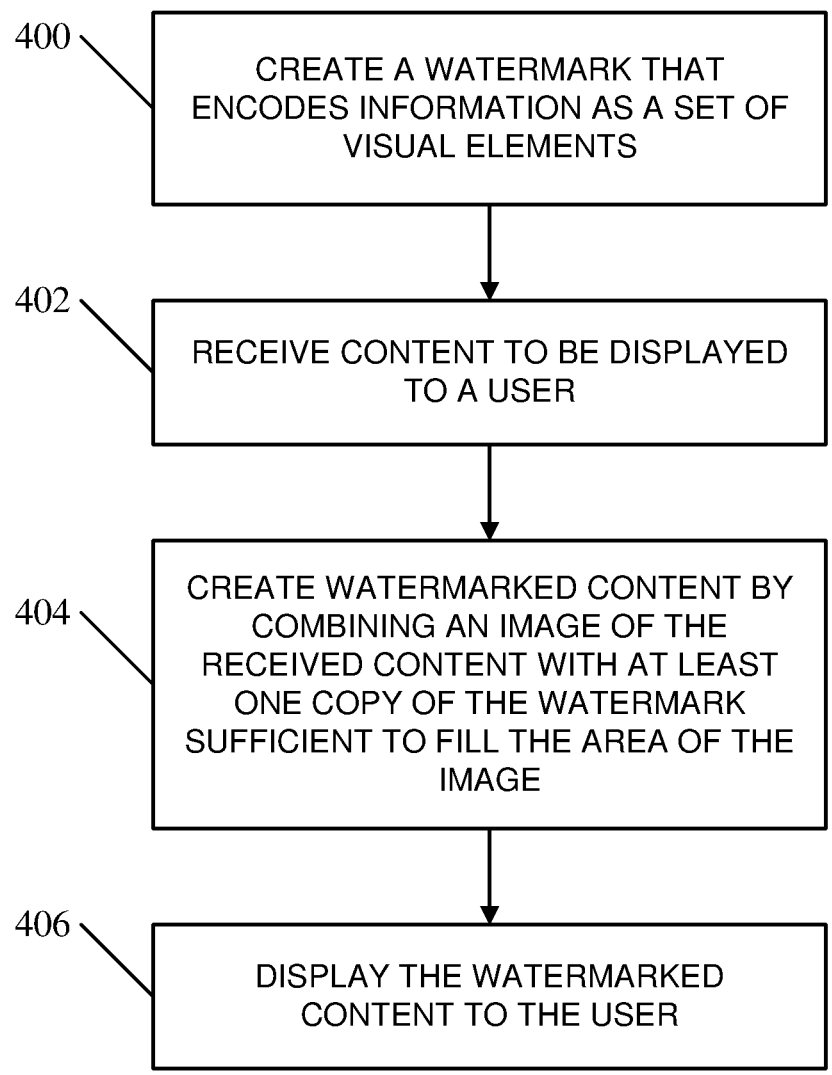
FIG. 4 is a flow chart illustrating an exemplary process for providing secure content watermarking according to an embodiment of the subject matter described herein.

FIG. 4 is a flow chart illustrating an exemplary process for providing secure content watermarking according to an embodiment of the subject matter described herein. In the embodiment illustrated in FIG. 4, the process includes creating a watermark that encodes information as a set of visual elements (step 400), receiving content to be displayed to a user (step 402), creating watermarked content by combining an image of the received content with at least one copy of the watermark sufficient to fill the area of the image (step 404), and displaying the watermarked content to the user (step 406).

Figure 5:
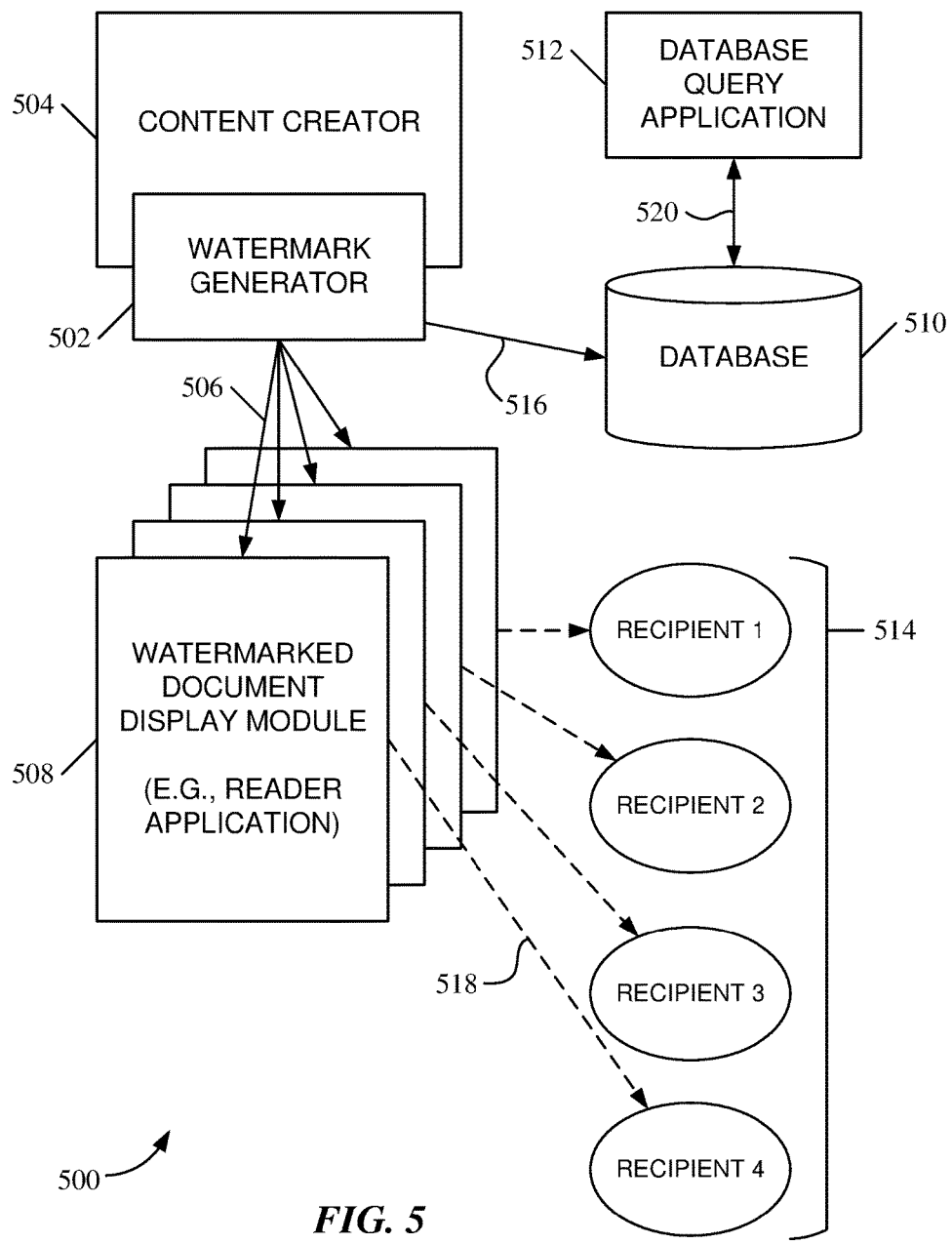
FIG. 5 is a block diagram illustrating an exemplary system for for providing secure document watermarking according to an embodiment of the subject matter described herein.

FIG. 5 is a block diagram illustrating an exemplary system for providing secure document watermarking according to an embodiment of the subject matter described herein. In the embodiment illustrated in FIG. 5, system 500 includes a watermark generator 502 that interacts with a content creator 504 for providing watermarked documents 506 that will be viewed by watermarked document reader applications 508. Content creator 504 may be a publishing application, for example, or other type of content creation application. In one embodiment, a database 510 may be used to store the generated watermarks, information that is encoded into the generated watermarks, or both. Other information may also be stored in database 510. In one embodiment, a database query application 512 may provide direct access to database 510. System 500 allows the creation of watermarked documents 506, where each watermarked document is tailored to a specific intended audience.

In the embodiment illustrated in FIG. 5, there are four distinct audiences, labeled audience 1, audience 2, audience 3, and audience 4, which are collectively referred to as audiences 514. Each audience, which may be a person, a group of people, an organization or business entity, a library, a message board, and so on, will receive a watermarked document created specifically for that audience. It is noted that, in the example illustrated in FIG. 5, the set of watermarked documents 506 may be different documents, each with different content tailored for its specific audience and each having a unique watermark, or they may be copies of the same document, each with the same content but each having a unique watermark, or variations of the above.

An example operation of system 500 will now be described. In this example, content creator 504 is being used to generate watermarked documents 506, each of which to be delivered to a specific audience from the set of audiences 514. For brevity of description, the terms "producer" and "consumer" may be used to refer to publishing application 504 or other content provider and the intended audience for the watermarked document, respectively.

In the embodiment illustrated in FIG. 5, system 500 is used to produce a document that needs watermarking that is unique to each audience member or "recipient". In one embodiment, content creator 504 lists each authorized recipient by name, email address, and/or other identifier. In one embodiment, watermark generator 502 assigns a recipient identifier number (RIN) to each audience member. Watermark generator 502 generates a unique signature for the document and posts the document signature, along with each recipient's name, email address and RIN to database 510 (data transfer 516). Watermark generator 502 embeds the document's signature and/or each recipient's RIN in the document as secure metadata, using a cryptographically assured mechanism. Other information may also be embedded into the document in this manner. A single watermarked document may include signatures, RINs, or other information for one recipient or for multiple recipients. A single RIN may likewise be used by one recipient or multiple recipients.

In one embodiment, watermark generator 502 may be a plug-in, an add-on, a kernel extension, an external application or function, or other code that may be used by content creator 504. Watermark generator 502 may accept some input, such as the recipient name, email address, RIN, etc., which it uses to generate the watermark. The input may directly or indirectly identify the specific watermarked document itself, the source of the watermarked document, the intended audience of the watermarked document, or other information such as date, time, creator, user name, etc.

In the embodiment illustrated in FIG. 5, content creator 504 then sends each document to its intended recipient, who uses reader application 508 to view the document (518). In one embodiment, along with the document, each recipient will receive a unique URL in which they can retrieve the document RIN. Alternatively, the sender can directly provide the RIN to user.

In one embodiment, when the reader opens the document, they are prompted to enter their RIN. Upon entering the correct RIN, the document becomes visible, with their unique watermark embedded in the document. Existing content rights management mechanisms assure that the content cannot be copied out or printed without the watermark.

Should the document be compromised, in either electronic or paper form, the watermark or other information embedded in the document can be entered into query application 512 which queries database 510 to determine the identity of account responsible for the leak (query 520.)

Figure 6:
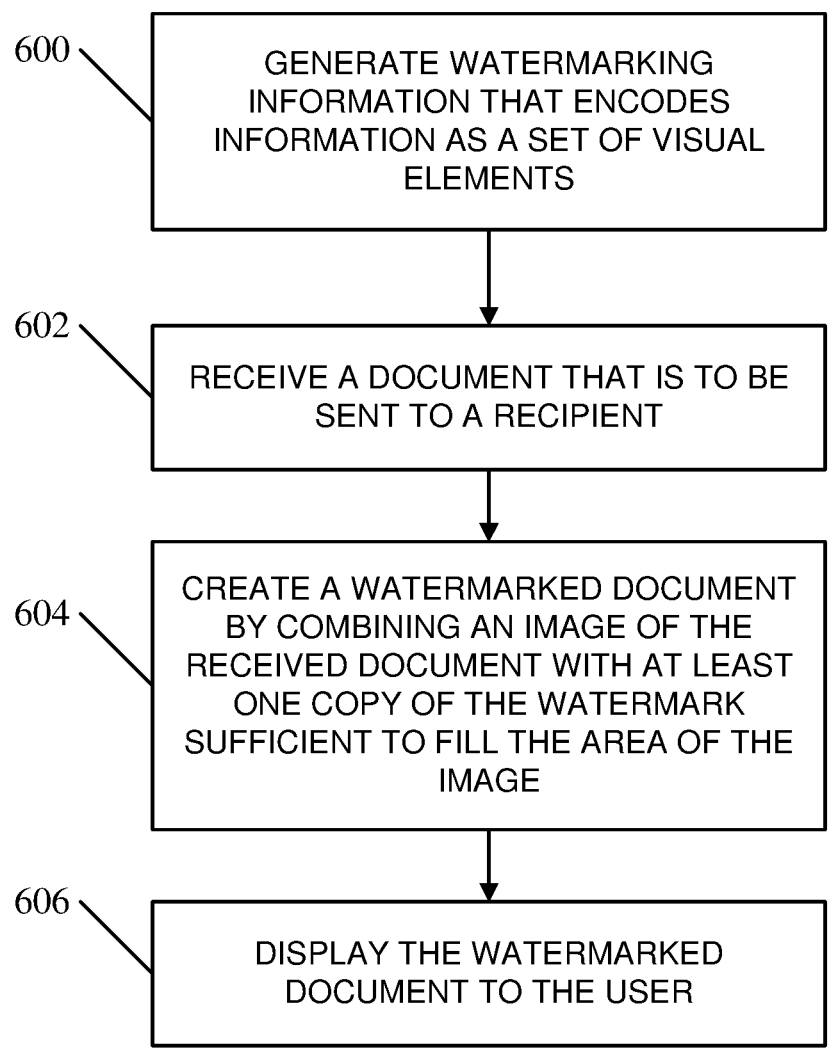
FIG. 6 is a flow chart illustrating an exemplary process for providing secure document watermarking according to an embodiment of the subject matter described herein.

FIG. 6 is a flow chart illustrating an exemplary process for providing secure document watermarking according to an embodiment of the subject matter described herein. In the embodiment illustrated in FIG. 6, the process includes generating watermarking information that encodes information as a set of visual elements (step 600). In one embodiment, the encoded information identifies an intended recipient. The process includes receiving a document that is to be sent to the recipient (step 602), creating a watermarked document by combining an image of the received document with one or more copies of the watermark, the number of copies being sufficient to fill the area of the image (step 604), and displaying the watermarked document to the user (step 606).

In one embodiment, combining the received content and the watermark includes embedding the watermarking information within a document that is to be sent to the intended recipient and that is viewable by a display module that displays the document overlaid with copies of a watermark generated from the watermarking information. In one embodiment, sending the watermarked document to the intended recipient includes sending the watermarked document to a remote user, and displaying the watermarked content includes displaying the watermarked document to the intended recipient via a display module.

It should be noted that here, the term "document" is not intended to be limited to text files, word processor files, and the like, but also contemplates images, pictures, videos, movies, audio files, collections of data, application files, computer files of any type, and also data which may not be in file format, such as streaming data, raw data, databases, portions of data storage, etc. Likewise, "displaying" a document to a user is not limited to visually displays of visual data, but contemplates many different forms of presentation of watermarked data to an intended recipient for consumption.

Figure 7:
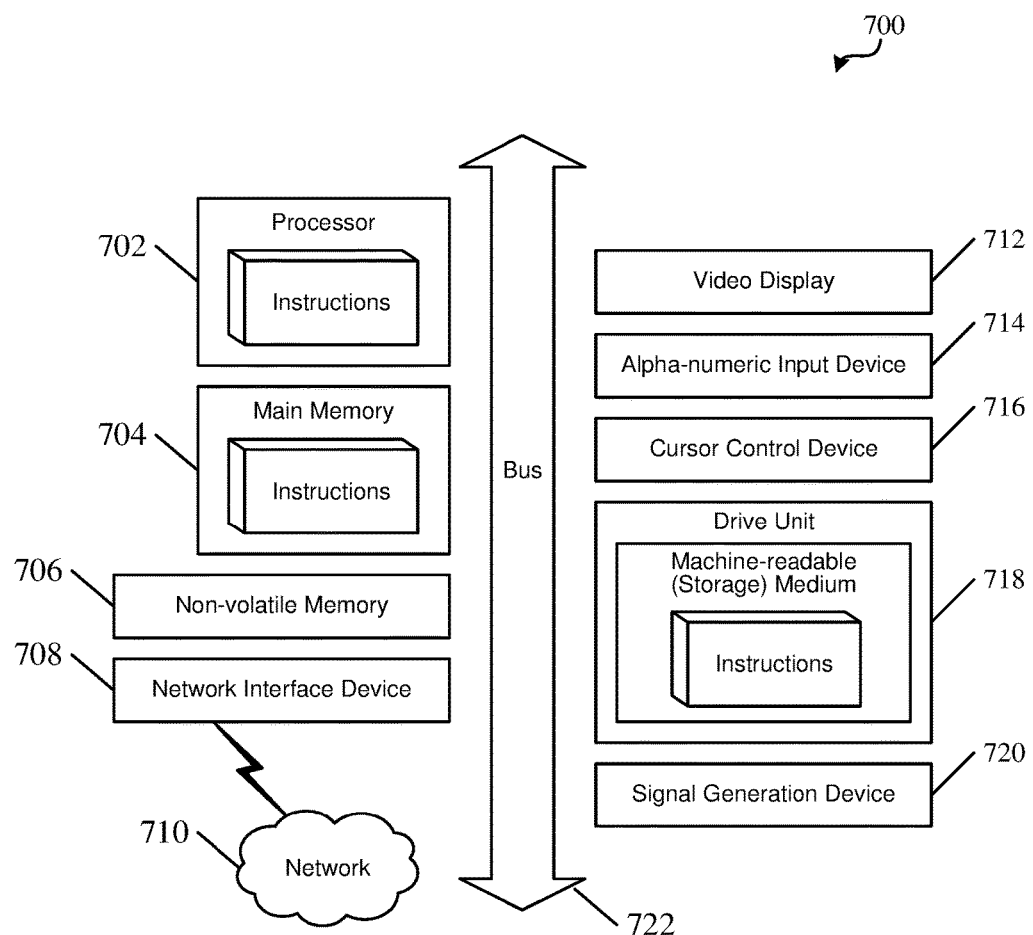
FIG. 7 is a block diagram illustrating an exemplary machine in the form of a computer system within which a set of instructions, for causing the machine to perform any one or more of the methodologies discussed herein, may be executed.

FIG. 7 is a block diagram illustrating an exemplary machine in the form of a computer system within which a set of instructions, for causing the machine to perform any one or more of the methodologies discussed herein, may be executed.

In the example of FIG. 7, the computer system 700 may include a processor 702, main memory 704, non-volatile memory 706, and a network interface device 708 for connecting to a network 710. System 700 may include a video display 712, alphanumeric input device 714, such as a keyboard or touch-sensitive surface or screen, a cursor control device 716, such as a mouse, stylus, or touch-sensitive surface or screen, a drive unit 718 containing a machine-readable storage medium, and a signal generation device 720, such as a speaker, microphone, sensor, light, and so on. Various common components (e.g., cache memory) are omitted for illustrative simplicity.

The computer system 700 is intended to illustrate a hardware device on which any of the components depicted in the example of FIG. 3 (and any other components described in this specification) can be implemented. The computer system 700 can be of any applicable known or convenient type. The components of the computer system 700 can be coupled together via a bus or through some other known or convenient device.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 700. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system. The interface can include an analog modem, ISDN modem, cable modem, token ring interface, satellite transmission interface (e.g. "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device.

In operation, the computer system 700 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

Advantages over conventional approaches. Conventional approaches to digital watermarking require tight interfacing with existing applications and involve modifying the document or content in question. The ability to overlay watermarking over any part of the screen, not just over an image being displayed, a document being displayed or edited, or a web or arbitrary application session, has not existed. Currently there is no easy mechanism for watermarking screen sharing sessions. The methods and systems described herein have the following advantages:

The encoding of session data is obscured. User information is not readily displayed.

Any screen rendering application can implement Session Watermarking.

The screen remains highly legible with minimal impact to user experience.

High redundancy of watermark ensures that even a small amount of coverage offers SIDI recovery.

The subject matter described herein is not limited to HTML based rendering, but can be applied to any screen session in which unique watermarking is desired. The watermarks may be applied on a per-session and/or per-user basis. The systems and methods described herein are well-suited to complement collaboration platforms. For example, by making users "log in" to the session, a session watermark may be overlaid on top of the screen session. If anybody takes a picture of the screen or executes a screen capture, their SIDI is embedded, with a high degree of redundancy. Should screen captures be compromised and the presenter learns of it, the presenter can enter the appropriate Session Watermark data in the SIDI recovery panel and obtain the SIDI. This is of significant value as a deterrent in which screen sharing and collaboration tools are used to discuss and present proprietary and confidential data. Customers working on sensitive projects still need to collaborate, often with a large and diverse team and many times data presented is leaked, placing confidential projects at risk. While an attendee can certainly recreate the data from scratch, they are often called on to produce "evidence" of the confidential presentation, such as screen captures.

Embodiments.

1. A method for secure content watermarking, where the method includes generating a watermark that encodes information as a set of visual elements, receiving content from a content provider, and creating watermarked content by overlaying an image of the received content with at least one copy of the watermark sufficient to fill the area of the image.

2. The method of embodiment 1 comprising displaying the watermarked content to the user.

3. The method of embodiment 2 wherein the watermarked content fills the display entirely.

4. The method of embodiment 1 wherein the received content comprises data from a remote session of a user.

5. The method of embodiment 4 wherein the data comprises an image of a remote desktop or remote application.

6. The method of embodiment 1 wherein the encoded information comprises session-related information.

7. The method of embodiment 6 wherein the encoded session-related information includes information to identify a session, a user, a component of hardware, local or remote compute resources, a web browser or other application, a network, a date, a time, or a location.

8. The method of embodiment 1 wherein the set of visual elements comprises dots, lines, shapes, glyphs, colors, or images.

9. The method of embodiment 1 wherein the set of visual elements encodes information via size, color, shape, position, spacing, or variations of the above.

10. The method of embodiment 1 wherein creating the watermarked content includes generating the watermark and tiling the watermark across the area of the received content.

11. The method of embodiment 1 wherein generating a watermark includes generating a watermark that is encoded for error correction.

12. The method of embodiment 1 wherein the watermark represents a number that identifies an entry in a collection of data that is used to store session-related information.

13. The method of embodiment 1 wherein displaying the watermarked content to the user comprises filling all of the available display area with the watermarked content.

14. A method for identifying the source of improperly shared information, where the method includes receiving an image of improperly shared information, extracting from the received image a watermark that encodes information as a set of visual elements, decoding the watermark to extract the information, and using the extracted information to determine a source of the image.

15. The method of embodiment 14 wherein the image comprises a screen shot of a remote desktop session of a user; wherein the extracted information includes session related information, and wherein using the extracted information to determine a source of the image includes using the session related information to identify the session from which the screen shot was taken.

16. The method of embodiment 15 comprising identifying a user, a hardware device, a network, a date, a time, a geographic location, or a network topographic location associated with the session from which the screen shot was taken.

17. The method of embodiment 15 wherein decoding the watermark includes extracting a number from the watermark.

18. The method of embodiment 17 wherein the extracted number includes a session identification number.

19. The method of embodiment 17 wherein the extracted number includes an index into database that contains session information.

20. The method of embodiment 14 wherein the image of improperly shared information comprises an image of a document, wherein the extracted information includes information associated with an author of the document, a distributor or sender of the document, a creation, modification, transmission, or receipt date or time of the document, an intended recipient of the document, an actual recipient of the document, or a distribution channel of the document.

21. A method for secure document watermarking, where the method includes generating watermarking information that identifies an intended recipient, embedding the watermarking information within a document that is to be sent to the intended document recipient and that is viewable by a display module that displays the document overlaid with at least one copy of a watermark generated from the watermarking information sufficient to fill the area of the document visible to the intended recipient.

22. The method of embodiment 21 wherein the watermarking information comprises the watermark that will be overlaid on the document.

23. The method of embodiment 21 wherein the watermarking information comprises information that the display module uses to generate the watermark that will be overlaid on the document.

24. The method of embodiment 21 comprising sending the watermarked document to the intended recipient.

25. The method of embodiment 22 comprising displaying the watermarked document to the intended recipient via the display module that displays the document overlaid with copies of a watermark generated from the watermarking information.

26. A system for secure content watermarking, the system including a first module for generating a watermark that encodes information as a set of visual elements; and a second module for receiving content from a content provider and creating watermarked content by overlaying an image of the received content with at least one copy of the watermark sufficient to fill the area of the image.

27. The system of embodiment 26 comprising a third module for displaying the watermarked content to a user.

28. The system of embodiment 26 wherein the encoded session-related information includes information to identify a session, a user, a component of hardware, local or remote compute resources, a web browser or other application, a network, a date, a time, or a location.

29. The system of embodiment 26 wherein the set of visual elements comprises dots, lines, shapes, glyphs, colors, or images.

30. The system of embodiment 26 wherein the set of visual elements encodes information via size, color, shape, position, spacing, or variations of the above.

31. The system of embodiment 26 wherein creating the watermarked image includes generating the watermark and tiling the watermark across the area of the image.

32. The system of embodiment 26 wherein generating a watermark includes generating a watermark that is encoded for error correction.

33. The system of embodiment 26 wherein the watermark represents a number that identifies an entry in a collection of data that is used to store session-related information.

34. The system of embodiment 26 wherein displaying the watermarked image to the user comprises filling all of the available display area with the watermarked image.

35. The system of embodiment 26 wherein the received image of a remote session of a user includes an image of a remote desktop or remote application.

36. The system of embodiment 26 wherein the received content comprises an image of a remote session of a user.

37. A system for secure document watermarking, the system including a watermarking module for generating watermarking information that identifies an intended recipient, and an embedding module for embedding the watermarking information within a document that is to be sent to the intended recipient and that is viewable by a display module that displays the document overlaid with copies of a watermark generated from the watermarking information.

38. The system of embodiment 37 comprising a display module that displays the document overlaid with copies of a watermark generated from the watermarking information.

39. The system of embodiment 38 wherein the embedding module sends the document with embedded watermarking information to the display module.

40. A computer readable medium having stored thereon computer executable instructions that when executed by a processor of a computer control the computer to perform steps comprising: generating a watermark that encodes information as a set of visual elements; receiving content from a content provider; and creating watermarked content by overlaying an image of the received content with at least one copy of the watermark sufficient to fill the area of the image.

41. A computer readable medium having stored thereon computer executable instructions that when executed by a processor of a computer control the computer to perform steps comprising: generating watermarking information that identifies an intended recipient; and embedding the watermarking information within a document that is to be sent to the intended document recipient and that is viewable by a display module that displays the document overlaid with at least one copy of a watermark generated from the watermarking information sufficient to fill the area of the document visible to the intended recipient.

What is claimed is:

1. A method for secure content watermarking, the method comprising:
generating a watermark that encodes information as a set of visual elements;
receiving content to be displayed to a user, the content comprising an image of a local or remote desktop, workspace, or application;
creating watermarked content by combining the image of the received content with at least one copy of the watermark sufficient to fill the area of the image; and
displaying the watermarked content to the user via a display device having a display area, the watermarked content entirely filling the display area of the display device.

2. The method of claim 1 wherein combining the image of the received content with the at least one copy of the watermark comprises:
overlaying the watermark onto the image;
adding the watermark to the image;
subtracting the watermark from the image; or
exclusive OR (XOR)-ing the watermark with the image.

3. The method of claim 1 wherein the received content comprises data from a local or remote session of the user and that represents a graphical workspace of the user.

4. The method of claim 1 wherein the content to be displayed to a user comprises a document and wherein displaying the watermarked content comprises displaying the document to the user.

5. The method of claim 1 wherein the encoded information comprises information to directly or indirectly identify: a session, a user, a component of hardware, local or remote compute resources, a web browser or other application, a network, a date, a time, or a location.

6. The method of claim 1 wherein the set of visual elements comprises dots, lines, shapes, glyphs, colors, or images.

7. The method of claim 1 wherein the set of visual elements encodes information via size, color, shape, position, spacing, or variations of the above.

8. The method of claim 1 wherein creating the watermarked content includes generating the watermark and tiling the watermark across the area of the received content.

9. The method of claim 1 wherein generating a watermark includes generating a watermark that is encoded for error correction.

10. The method of claim 1 wherein a color of the watermark varies according to the position of the watermark within the display area.

11. The method of claim 1 wherein a color of the watermark varies according to the content of the display area over which the watermark appears.

12. The method of claim 1 wherein displaying the watermarked content to the user via the display device comprises sending the watermarked content to the user for display via a remote display device.

13. A system for secure content watermarking, the system comprising:
a first module comprising a processor and for generating a watermark that encodes information as a set of visual elements;
a second module comprising a processor and for receiving content to be displayed to a user, the content comprising an image of a local or remote desktop, workspace, or application, and creating watermarked content by combining the image of the received content with at least one copy of the watermark sufficient to fill the area of the image; and
a display device having a display area for displaying the watermarked content to the user, wherein the watermarked content entirely fills the display area of the display device.

14. The system of claim 13 wherein the second module combines the image of the received content by:
overlaying the watermark onto the image;
adding the watermark to the image;
subtracting the watermark from the image; or
exclusive OR (XOR)ing the watermark with the image.

15. The system of claim 13 wherein the received content comprises data from a local or remote session of the user and that represents a graphical workspace of the user.

16. The system of claim 13 wherein the content to be displayed to a user comprises a document and wherein displaying the watermarked content comprises displaying the document to the user.

17. The system of claim 13 wherein the encoded session-related information comprises information to directly or indirectly identify a session, a user, a component of hardware, local or remote compute resources, a web browser or other application, a network, a date, a time, or a location.

18. The system of claim 13 wherein the set of visual elements comprises dots, lines, shapes, glyphs, colors, or images.

19. The system of claim 13 wherein the set of visual elements encodes information via size, color, shape, position, spacing, or variations of the above.

20. The system of claim 13 wherein creating the watermarked image includes generating the watermark and tiling the watermark across the area of the image.

21. The system of claim 13 wherein generating a watermark includes generating a watermark that is encoded for error correction.

22. The system of claim 13 wherein a color of the watermark varies according to the position of the watermark within the display area.

23. The system of claim 13 wherein a color of the watermark varies according to the content of the display area over which the watermark appears.

24. A non-transitory computer readable medium having stored thereon computer executable instructions that when executed by a processor of a computer control the computer to perform steps comprising:
generating a watermark that encodes information as a set of visual elements;
receiving content to be displayed to a user, the content comprising an image of a local or remote desktop, workspace, or application;
creating watermarked content by combining the image of the received content with at least one copy of the watermark sufficient to fill the area of the image; and
displaying the watermarked content to the user via a display device having a display area, the watermarked content entirely filling the display area of the display device.

* * * * *